(12) United States Patent
Betz et al.

(10) Patent No.: US 7,950,481 B2
(45) Date of Patent: May 31, 2011

(54) ELECTRIC POWERTRAIN FOR MACHINE

(75) Inventors: Michael D. Betz, Knoxville, IL (US);
Kent A. Casey, Washington, IL (US);
Stephen C. Garnett, Princeville, IL
(US); Chih C. Liang, Peoria, IL (US);
Andrew J. Tonsor, East Peoria, IL (US);
Michael E. Vanderham, East Peoria, IL
(US); Edward L. Zwilling, Washington,
IL (US)

(73) Assignee: Caterpillar Inc., Peoria, IL (US)

( * ) Notice: Subject to any disclaimer, the term of this patent is extended or adjusted under 35 U.S.C. 154(b) by 1174 days.

(21) Appl. No.: 11/237,873

(22) Filed: Sep. 29, 2005

(65) Prior Publication Data

US 2007/0080236 A1    Apr. 12, 2007

(51) Int. Cl.
*B62D 11/00* (2006.01)
(52) U.S. Cl. .................................. 180/65.31; 180/6.44
(58) Field of Classification Search .................. 180/242,
180/244, 248, 251, 65.1, 65.3, 65.4, 6.44,
180/6.2, 6.7, 9.44; 37/348; 701/41, 50; 475/149
See application file for complete search history.

(56) References Cited

U.S. PATENT DOCUMENTS

| | | | | |
|---|---|---|---|---|
| 1,991,094 A * | 2/1935 | Higley | | 74/664 |
| 3,966,005 A * | 6/1976 | Binger | | 180/6.44 |
| 4,280,579 A * | 7/1981 | Zaunberger et al. | | 180/6.44 |
| 4,700,794 A * | 10/1987 | Bernhagen et al. | | 180/6.44 |
| 4,803,897 A * | 2/1989 | Reed | | 475/6 |
| 4,986,377 A * | 1/1991 | Moriarty | | 180/6.5 |
| 4,998,591 A * | 3/1991 | Zaunberger | | 180/6.44 |
| 5,168,946 A * | 12/1992 | Dorgan | | 180/6.44 |
| 5,195,600 A * | 3/1993 | Dorgan | | 180/9.1 |
| 5,363,937 A | 11/1994 | James | | |
| 5,445,234 A * | 8/1995 | Hall, III | | 180/6.28 |
| 5,509,491 A * | 4/1996 | Hall, III | | 180/9.44 |
| 5,586,613 A | 12/1996 | Ehsani | | |
| 5,722,501 A * | 3/1998 | Finch et al. | | 180/6.44 |
| 5,915,292 A | 6/1999 | Abels | | |
| 5,919,109 A * | 7/1999 | Fleckenstein | | 475/151 |
| 5,991,677 A * | 11/1999 | Kinugawa et al. | | 701/50 |
| 6,024,182 A * | 2/2000 | Hamada et al. | | 180/6.28 |
| 6,119,061 A * | 9/2000 | Schenkel et al. | | 701/42 |
| 6,216,807 B1 | 4/2001 | Eckhoff | | |
| 6,260,465 B1 | 7/2001 | Zonak et al. | | |
| 6,283,239 B1 * | 9/2001 | Tsukamoto et al. | | 180/65.2 |
| 6,358,176 B1 | 3/2002 | Nauheimer et al. | | |
| 6,527,070 B2 * | 3/2003 | Ryan | | 180/6.7 |
| 6,644,427 B2 * | 11/2003 | Schulte | | 180/65.25 |
| 6,656,074 B2 * | 12/2003 | Andriani | | 475/28 |

(Continued)

FOREIGN PATENT DOCUMENTS

EP    1452710    9/2004

(Continued)

*Primary Examiner* — J. Allen Shriver, II
*Assistant Examiner* — Jacob Meyer
(74) *Attorney, Agent, or Firm* — Finnegan, Henderson, Farabow, Garrett & Dunner LLP

(57) ABSTRACT

An electric powertrain includes an engine configured to provide mechanical energy and a generator operably coupled to the engine and configured to convert at least a portion of the mechanical energy into electric energy. The electric powertrain further includes at least one electric motor operably coupled to the generator, a plurality of driving members, and at least one power electronics unit configured to control at least one of the engine and the generator. The at least one electric motor is configured to provide torque for the plurality of driving members.

19 Claims, 6 Drawing Sheets

U.S. PATENT DOCUMENTS

| | | | |
|---|---|---|---|
| 6,678,972 B2 * | 1/2004 | Naruse et al. | 37/466 |
| 6,691,806 B2 * | 2/2004 | Wolfgang et al. | 180/6.7 |
| 6,705,030 B2 * | 3/2004 | Tokunaga | 37/348 |
| 6,708,787 B2 | 3/2004 | Naruse et al. | |
| 6,725,581 B2 | 4/2004 | Naruse et al. | |
| 6,745,117 B1 * | 6/2004 | Thacher et al. | 701/50 |
| 6,880,651 B2 * | 4/2005 | Loh et al. | 180/14.2 |
| 6,892,837 B2 * | 5/2005 | Simmons et al. | 180/6.44 |
| 7,074,151 B2 * | 7/2006 | Thompson | 475/225 |
| 7,122,914 B2 * | 10/2006 | Caruthers | 290/40 C |
| 7,152,705 B2 * | 12/2006 | Alster et al. | 180/65.245 |
| 7,309,300 B2 * | 12/2007 | Garnett et al. | 475/18 |
| 7,344,465 B2 * | 3/2008 | Swick et al. | 475/31 |
| 7,410,437 B2 * | 8/2008 | Garnett | 475/5 |
| 7,497,796 B2 * | 3/2009 | Ordo et al. | 475/5 |
| 7,621,354 B2 * | 11/2009 | Witzenberger et al. | 180/6.48 |
| 7,658,250 B2 * | 2/2010 | Betz et al. | 180/65.31 |
| 7,686,726 B2 * | 3/2010 | Thompson | 475/150 |
| 7,731,614 B2 * | 6/2010 | Casey et al. | 475/18 |
| 7,757,797 B2 * | 7/2010 | Dobereiner | 180/65.31 |
| 2002/0144848 A1 | 10/2002 | Schulte | |
| 2003/0119620 A1 * | 6/2003 | Zwilling et al. | 475/219 |
| 2003/0226291 A1 | 12/2003 | Naruse et al. | |
| 2004/0069542 A1 * | 4/2004 | Simmons et al. | 180/6.2 |
| 2004/0098983 A1 | 5/2004 | Naruse et al. | |
| 2004/0116228 A1 * | 6/2004 | Thompson | 475/28 |

FOREIGN PATENT DOCUMENTS

| | | |
|---|---|---|
| JP | 2005204494 | 7/2005 |
| WO | WO 94/09548 | 4/1994 |

\* cited by examiner

ELECTRIC POWERTRAIN FOR MACHINE

TECHNICAL FIELD

The present disclosure relates generally to an electric powertrain and, more particularly, an electric powertrain for a work machine.

BACKGROUND

Conventional work machines such as, for example, front-end loaders, bulldozers, and excavators, may generally be powered using an internal combustion engine such as, for example, a diesel engine, a gasoline engine, or other internal combustion engine known in the art. Such internal combustion engines may emit undesirable exhaust emissions and other pollutants during operation. In recent years, and for the foreseeable future, the reduction of exhaust emissions for internal combustion engines in general and for work machines in particular, has become a regulatory priority. Furthermore, increasing fuel efficiency of vehicles and work machines has also become of increased importance, for example, to reduce increased costs associated with the rising price of fossil fuels and/or reliance on imported oil.

Driven at least in part by new and future exhaust emissions regulations and a desire to reduce fuel consumption, alternative ways to power machines have been sought. One such alternative may relate to the use of powertrains having electric components such as, for example, electric motors, generators, and electronic control systems. Such electric components have been used previously in some vehicle powertrain applications. The use of such electric components, however, in work machines in general and in work machines having ground engaging tracks in particular, may present a number of challenges not associated with other types of vehicles.

Work machines having ground engaging tracks may often be used to perform functions that require a high output torque and a relatively low maximum ground speed. Further, work machines having ground engaging tracks may often be used in environments that require extra traction and/or used for performing functions that require a high drawbar pull, for example, a drawbar pull generally in the range of about one and one-half the weight of the work machine, for performing functions such as, for example, pushing and pulling dirt. Such applications generally require a high output torque and relatively low ground speed of less than about 9 mph, for example. In addition, it may be desirable for work machines having ground engaging tracks to have an infinitely variable transmission that prevents excessive lugging of the engine, that eliminates shifting, and that reduces the need for excessive operator control while still providing an efficient powertrain system. As a result, for work machines in general and for work machines having ground engaging tracks in particular, it may be desirable to have a powertrain having a high efficiency and variable speed control in order to perform such functions.

Work machines having ground engaging tracks may often perform cycling applications. Cycling applications are applications in which the use of a work machine may require repeated starting, stopping, and reversing of direction. For example, a bulldozer may push dirt in a forward direction, stop, reverse direction, stop again, and then push dirt in the forward direction again. Another example of such cycling occurs during a typical operation of a track-type front end loader, which may repeatedly move forward while picking up a load of dirt, move in a reverse direction while carrying the load, turn, move in a forward direction while carrying the load, lift the load and dump the load into a dump truck, and reverse direction to back away from the dump truck. These exemplary cycles are often repeated many times in quick succession. As a result of such cycling applications, the kinetic energy associated with moving the work machine must be absorbed when the work machine stops. Furthermore, due to the high final drive gear ratio that may be associated with, for example, the need to have a high drawbar pull, a high amount of inertia associated with a work machine's movement may be generally reflected back to the work machine's powertrain upon stopping. Therefore, due to the typical cycling applications that may be associated with work machines having ground engaging tracks, it may be desirable to provide a work machine powertrain that is able to transfer large amounts of kinetic energy and that has a relatively low inertia to reduce the effects of inertia during cycling applications.

Work machines having ground engaging tracks may be required to operate in environments typically hostile to air-cooled machinery such as, for example, swamp-like conditions or very dusty conditions. Such conditions may render it relatively unsatisfactory to use conventional cooling systems that may rely on, for example, air filters that may quickly clog. Furthermore, air-cooled components quickly fill with dirt or mud, thereby preventing sufficient cooling and leading to premature part failure. As a result, conventional air-cooled electric components may not be suitable for use in work machines operating in these environments.

Work machines having ground engaging tracks may have a limited amount of space for placement of powertrain components. As a result, it may be desirable to use powertrain components that are relatively compact in relation to their power and/or torque output such that they have a high power density. Many conventional air-cooled electric motors, however, lack sufficient power density for use in a work machine. Therefore, it may be desirable to provide a work machine having ground engaging tracks with a powertrain having a high power density.

Work machines having ground engaging tracks may generally include one or more work implements for performing tasks associated with a particular work machine that may be operated via, for example, one or more hydraulic cylinders actuated by a hydraulic system. For example, the actuation of one or more hydraulic cylinders may be used to raise and lower the blade of a bulldozer, and/or raise and lower the bucket of a front-end loader or an excavator. Such hydraulic systems may include one or more pumps for imparting pressure to the hydraulic system. Such pumps may generally be driven via an internal combustion engine. As a result, the internal combustion engine may not only be used to propel a work machine, but it may also be used to power various work implements actuated by hydraulic cylinders. Consequently, as the demands placed on the hydraulic pump(s) are increased, for example, when a load in an excavator bucket is raised, the internal combustion engine may be called upon to provide more power, which may generally be achieved by increasing the amount of air and fuel provided to the engine to increase its engine speed.

Sometimes, however, the increase in air and fuel cannot be achieved quickly enough in response to a sudden increase in power demand for providing power to the hydraulic pump(s). This may result in the engine lugging down or stalling. In addition, when the internal combustion engine is able to sufficiently respond to the sudden hydraulic pump demand by increasing its engine speed, more exhaust emissions and less fuel efficiency may generally result. Therefore, it may be desirable to provide a system that may provide sufficient power for motive force and to operate work machine implements without lugging down or stalling the internal combustion engine and that may not result in any significant additional emissions or reduced fuel efficiency.

One tracked vehicle having internal combustion engines combined with electric motors for propulsion is described in U.S. Pat. No. 6,691,806 (the '806 patent) issued to Wolfgang et al. on Feb. 17, 2004. The '806 patent describes a drive unit for a tracked vehicle having first and second electric generators and first and second internal combustion engines driving the generators to power two pairs of first and second electric motors, with each pair of electric motors for driving a track located on one side of the vehicle. The components are wired such that if the vehicle, especially a military vehicle, is partially damaged, the vehicle can continue to move.

Although the tracked vehicle of the '806 patent includes a combination of internal combustion engines, generators, and electric motors for movement, the '806 vehicle is not a work machine and does not address the problems outlined previously herein that may be associated with work machines.

The disclosed work machine may be directed to overcoming one or more of the problems set forth above.

SUMMARY OF THE INVENTION

In one aspect, the present disclosure includes an electric powertrain including an engine configured to provide mechanical energy and a generator operably coupled to the engine and configured to convert at least a portion of the mechanical energy into electric energy. The electric powertrain further includes at least one electric motor operably coupled to the generator, a plurality of driving members, and at least one power electronics unit configured to control at least one of the engine and the generator. The at least one electric motor is configured to provide torque for the plurality of driving members.

In a further aspect, the present disclosure includes a work machine that includes an engine configured to provide the work machine with mechanical energy, and a generator operably coupled to the engine and configured to convert at least a portion of the mechanical energy into electric energy. The work machine further includes at least one electric motor operably coupled to the generator, the at least one electric motor having a high power density. The work machine also includes driving members located on either side of the work machine and a differential steering unit operably coupled to the at least one electric motor and the driving members. The differential steering unit is configured to selectively control an amount of torque supplied to each of the driving members. The work machine further includes ground engaging members configured to propel the work machine. The ground engaging members are operably coupled to the driving members, and the at least one electric motor is configured to provide torque for the driving members such that the ground engaging members propel the work machine.

In still a further aspect, the present disclosure includes a work machine that includes at least one work implement, an engine configured to provide the work machine with mechanical energy, and a generator operably coupled to the engine and configured to convert at least a portion of the mechanical energy into electric energy. The work machine further includes at least two electric motors operably coupled to the generator and at least two driving members located on either side of the work machine. The work machine further includes ground engaging members configured to propel the work machine, the ground engaging members being operably coupled to the driving members. The at least two electric motors are operably coupled to the at least two driving members such that torque is supplied to one of the at least two ground engaging members via one of the at least two electric motors, and torque is supplied to another of the at least two ground engaging members via another of the at least two electric motors.

In still a further aspect, the present disclosure includes a work machine that includes at least one work implement, an engine configured to provide the work machine with mechanical energy, and a generator operably coupled to the engine and configured to convert at least a portion of the mechanical energy into electric energy. The work machine further includes at least one electric motor operably coupled to the generator, the at least one electric motor including a sealed, brushless, liquid-cooled electric motor. The work machine also includes track driving members located on either side of the work machine, and ground engaging members configured to propel the work machine. The ground engaging members are operably coupled to the driving members, and the at least one electric motor is configured to provide torque for the driving members such that the ground engaging members propel the work machine.

In still a further aspect, the present disclosure includes a method for operating a work machine including a plurality of ground engaging members and at least one work implement. The method includes operating an engine configured to provide the work machine with mechanical energy and converting at least a portion of the mechanical energy into electric energy via a generator operably coupled to the engine. The method further includes propelling the work machine by driving the ground engaging members via torque supplied by at least one electric motor operably coupled to the generator, and controlling at least one of the engine and the generator by operably coupling at least one power electronics unit to the engine and the generator and controlling at least one of the engine and the generator via the at least one power electronics unit.

DETAILED DESCRIPTION

Figure 1:
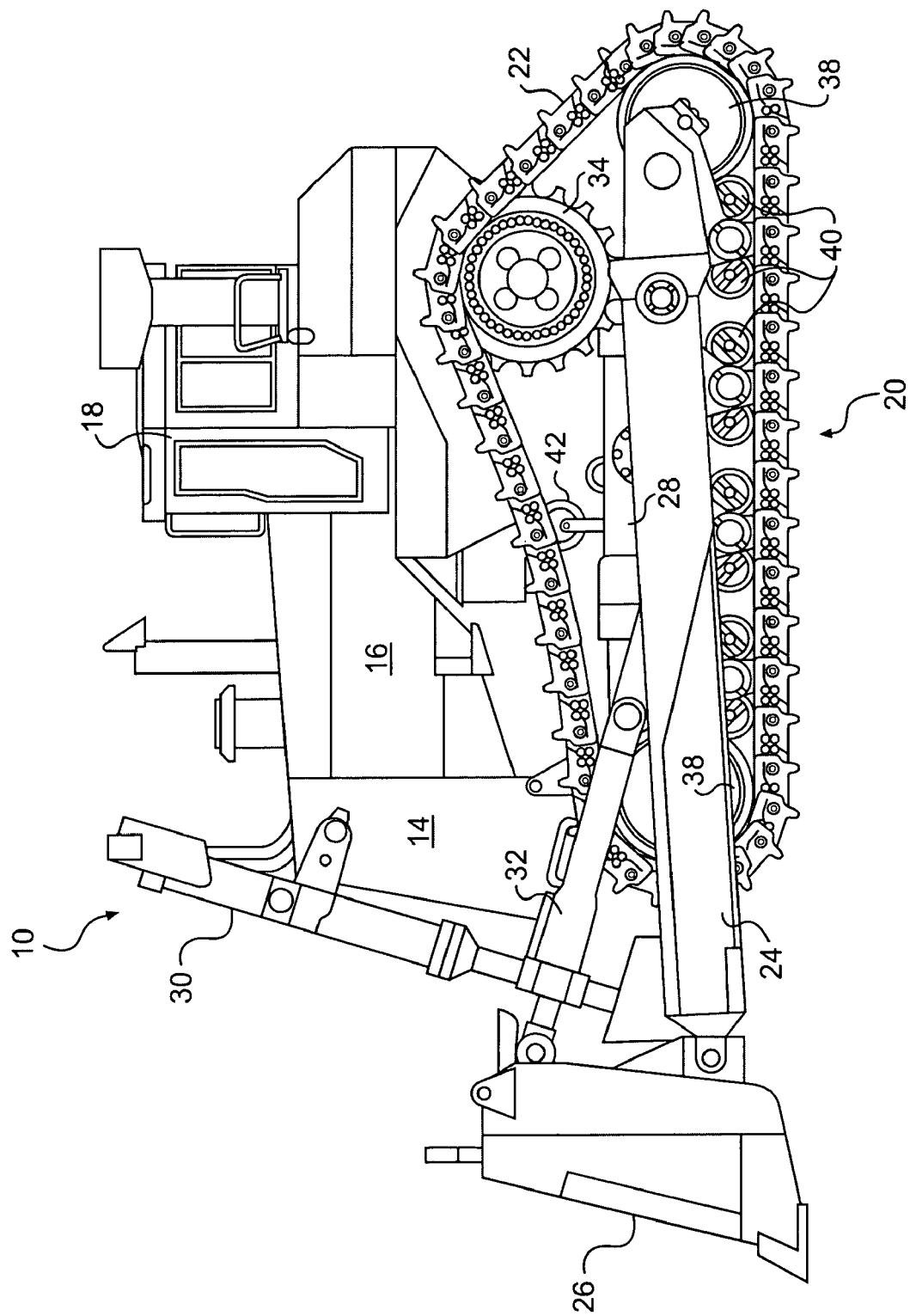
FIG. 1 is a diagrammatic side view of an exemplary work machine.

FIG. 1 illustrates an exemplary work machine 10 that may include an electric powertrain 12 (see, e.g., FIGS. 2-5). Although work machine 10 depicted in FIG. 1 is a track-type tractor, work machine 10 may be a track-type loader, a hydraulic excavator, a skid steer loader, an agricultural tractor, a wheel loader, or another work machine known to those having skill in the art. Work machine 10 may include a main frame 14 for housing a power source 16. Power source 16 may be configured to provide power to the various systems of work machine 10. Work machine 10 may also include a work station 18, and may further include an undercarriage 20 carrying ground engaging members 22 (e.g., two ground engaging tracks) located on opposite sides of main frame 14, which are configured to engage the ground and to propel work machine 10.

Undercarriage 20 may be configured to support two push arms 24 located on opposite sides of main frame 14. Push arms 24 may be connected at one end to a work implement 26 such as, for example, a blade of a bulldozer configured to push and/or pull, for example, dirt. The other end of each of push arms 24 may be connected to a roller frame 28 positioned on opposite sides of main frame 14. An alternative arrangement the work implement 26 or blade is connected to the main frame 14 by a power angle tilt arrangement or PAT (not shown). Work machine 10 may further include one or more lift cylinders 30 located on opposite sides of work machine 10, which may be connected to undercarriage 20 at one end and to work implement 26 at the other end. Lift cylinders 30 may each include a hydraulic actuator configured to extend and retract in response to operator commands such that work implement 26 may be raised and lowered relative to the ground via pivoting of push arms 24 relative to undercarriage 20.

Work machine 10 may further include one or more tilt cylinders 32 located in the vicinity of the front end of work machine 10, which may be connected to work implement 26 and push arm 24. The one or more tilt cylinders 32 may be configured to extend and retract in response to operator commands such that work implement 26 may be tilted left or right or pitch forward or back relative to work machine 10.

Undercarriage 20 may include one or more driving members 34 and 36 (see, e.g., FIGS. 2-5), for example, track driving members, each located on opposite sides of work machine 10. For example, driving members 34 and 36 are gear reduction final drives configured to transmit torque from electric powertrain 12 to the each of ground engaging tracks 22. Undercarriage 20 may also include one or more idler wheels 38, one or more mid-rollers 40, and one or more carrier rollers 42 associated with each of ground engaging tracks 22, which may be configured to guide ground engaging tracks 22 and to distribute the weight of work machine 10 onto ground engaging tracks 22 adjacent the ground.

Figure 2:
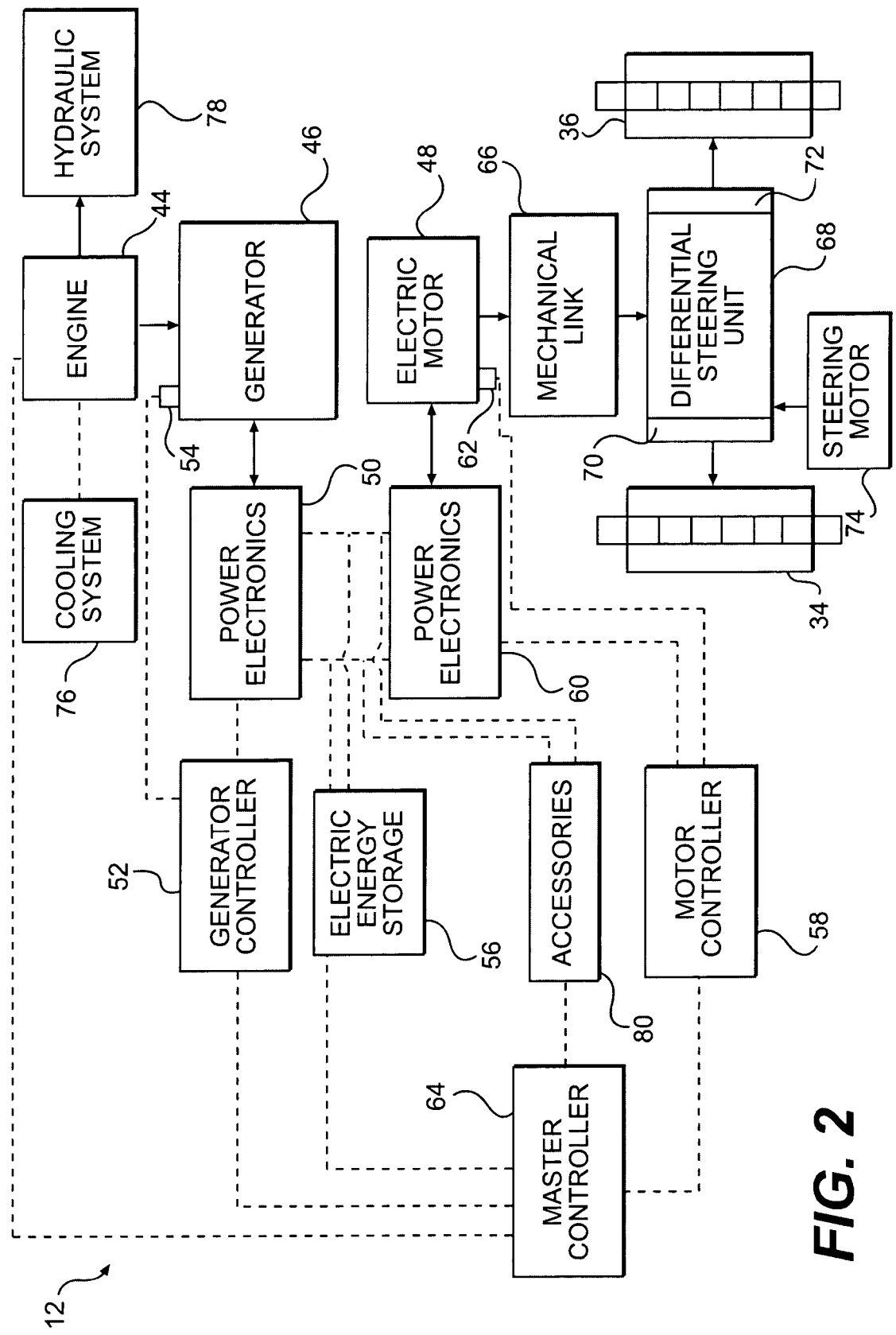
FIG. 2 is a schematic block diagram of a work machine having an electric powertrain according to an exemplary disclosed embodiment.

FIGS. 2-5 illustrate several exemplary embodiments of electric powertrain 12 configured to provide power to a work machine 10. Referring to FIG. 2, electric powertrain 12 includes an engine 44, for example, a diesel engine, a gasoline engine, a natural gas engine, a gas-turbine engine, or any other engine known in the art. Engine 44 may be operatively associated with a generator 46 and may drive generator 46 such that mechanical energy from engine 44 is converted into electric energy. Generator 46 may be any known AC or DC generator such as, permanent magnet, induction, switched-reluctance, or a hybrid combination of the above, and may also be sealed, brushless, and/or liquid cooled, for example, to provide a more durable design. Generator 46 may be used to provide electric energy to power one or more electric motors 48. Electric powertrain 12 may further include power electronics 50 and a generator controller 52 operably coupled to a generator sensor 54, for example, a speed sensor. Power electronics 50 may include a power inverter, an inverter controller, and/or generator software configured to control the conversion of at least a portion of the mechanical energy into electric energy. As an alternative (not shown), the generator may include a rectifier in place of the power electronics 50 and not require a speed sensor based on the control logic used.

Generator controller 52 may be configured to control the conversion of alternating current from generator 46 into a high voltage direct current and may monitor generator 46's operation via generator sensor 54.

Electric powertrain 12 may also include an electric energy storage system 56 such as, for example, a battery and/or an ultra-capacitor, or flywheel, for storing any excess electric energy generated by generator 46 and/or for providing any additional electric energy that may be needed when starting work machine 10 and/or during operation of work machine 10. For example, when work machine 10 is operating in a low load condition, for example, it is neither traveling across the ground nor operating any of its implements (e.g., work implement 26), engine 44 may continue to run at a given engine speed or engine speed range. In such relatively low load conditions, it may be possible to operate work machine 10 more efficiently, for example, and generator 46 can continue to convert mechanical energy into electric energy, which may be stored in electric energy storage system 56. Alternatively, for a situation in which work machine 10 is traveling across the ground at a given speed, and the operator commands a work implement to perform a task such as, for example, the operator commands a bucket containing a load of dirt to be raised while the work machine remains moving, electric energy storage system 56 may provide additional energy beyond the electric energy being generated by generator 46, and may prevent the engine from lugging down or stalling, and/or may prevent work machine 10 from slowing down.

Electric powertrain 12 may further include a motor controller 58, power electronics 60 operably coupled to electric motor 48 and at least one motor controller 58, and/or a motor sensor 62, for example, a speed sensor. However, it should be understood that speed sensor 62 may not be required based on the control logic used. Power electronics 60 may include a power converter, an inverter controller, and/or motor software, and may be configured to convert and control electricity, for example, provided to electric motor 48, thereby providing control of speed and torque for the propulsion of work machine 10. Power electronics 60 may be housed in a compartment, which may be sealed and liquid cooled. For example, generator 46 may be operatively associated with electric motor 48 via power electronics 50, generator controller 52, motor controller 58, and/or power electronics 60.

Although referred to in the singular, electric motor 48 may be more than one electric motor, and the schematic depiction in FIG. 2 of electric motor 48 may represent more than one electric motor such as, for example, two or more electric motors mechanically combined via a gear or gear train. By virtue of receiving electric energy from generator 46 and/or electric energy storage system 56, electric motor 48 creates a torque for driving a mechanical link 66 such as, for example, a gear assembly. Electric motor 48 may be any known AC or DC motor such as, permanent magnet, induction, switched-reluctance, or a hybrid combination of the above, and may also be sealed, brushless, and/or liquid cooled. Electric powertrain 12 may further include a master controller 64 configured to control engine 44, generator controller 52, electric energy storage system 56, and/or motor controller 58 such that electric powertrain 12 may be operated in a coordinated and controlled fashion.

Mechanical link 66 may be operatively associated with a differential steering unit 68 such as, for example, the differential steering unit disclosed in U.S. Pat. No. 4,434,680 issued to Riediger et al., or any other known steering unit, so as to match the speed and torque of electric motor 48 to the desired propulsion output of driving members 34 and 36. Differential steering unit 68 may be configured to transfer torque from mechanical link 66 to either or both of the track driving members 34 and 36 to operate ground engaging tracks 22. Differential steering unit 68 may include one or more planetary gear trains (not shown) that allow the amount of torque transferred from mechanical link 66 to each of driving members 34 and 36 to be adjusted according to operator commands.

Differential steering unit 68 may also be associated with braking devices 70 and 72 that may be configured to selectively apply a braking force resulting in a slowing of either or both of driving members 34 and 36. Alternatively, or in addition, electric motor 48 may operate as a generator, and generator 46 may operate as a motor, for example, during the braking of work machine 10 and/or during the slowing of electric motor 48 and/or generator 46. For example, electric motor 48 may be configured and controlled such that work machine 10 may be slowed while using electric motor 48 as a generator, thereby converting kinetic energy associated with work machine 10 into electric energy, which may be stored in electric energy storage system 56. In addition, electric motor 48's inertia and speed may also be converted into electric energy during slowing of electric motor 48. Further, generator 46 may operate as a motor, for example, to provide an input back into engine 44 so as to over speed the engine 44 during periods in which electric powertrain 12 experiences an excess in energy. This may act to reduce fuel consumption and/or emissions from engine 44. As an alternative, this excess energy may be dissipated across a resistive grid (not shown).

Electric powertrain 12 may further include a steering motor 74 operatively associated with differential steering unit 68. Steering motor 74 is configured to selectively adjust the amount of torque transferred to each of driving members 34 and 36, such that work machine 10 can be propelled in a straight forward direction, a straight rearward direction, and turned while traveling in either the forward or reverse direction by virtue of selectively adjusting the amount of torque transferred to each of driving members 34 and 36 based on an operator's commands. Steering motor 74 may be powered by hydraulic fluid pressure, electricity, and/or other power sources. Steering motor 74 may selectively adjust the torque transferred to driving members 34 and 36 by selectively either immobilizing, rotating in a forward direction, or rotating in a reverse direction, a portion (e.g., a ring gear) of one of the planetary gear trains of differential steering unit 68, thereby biasing the torque applied to driving members 34 and 36. Alternatively, changing the speed of steering motor 74 will increase or decrease the speed of driving members 34 and 36, respectively, according to the speed change and direction of rotation of steering motor 74.

Figure 2A:
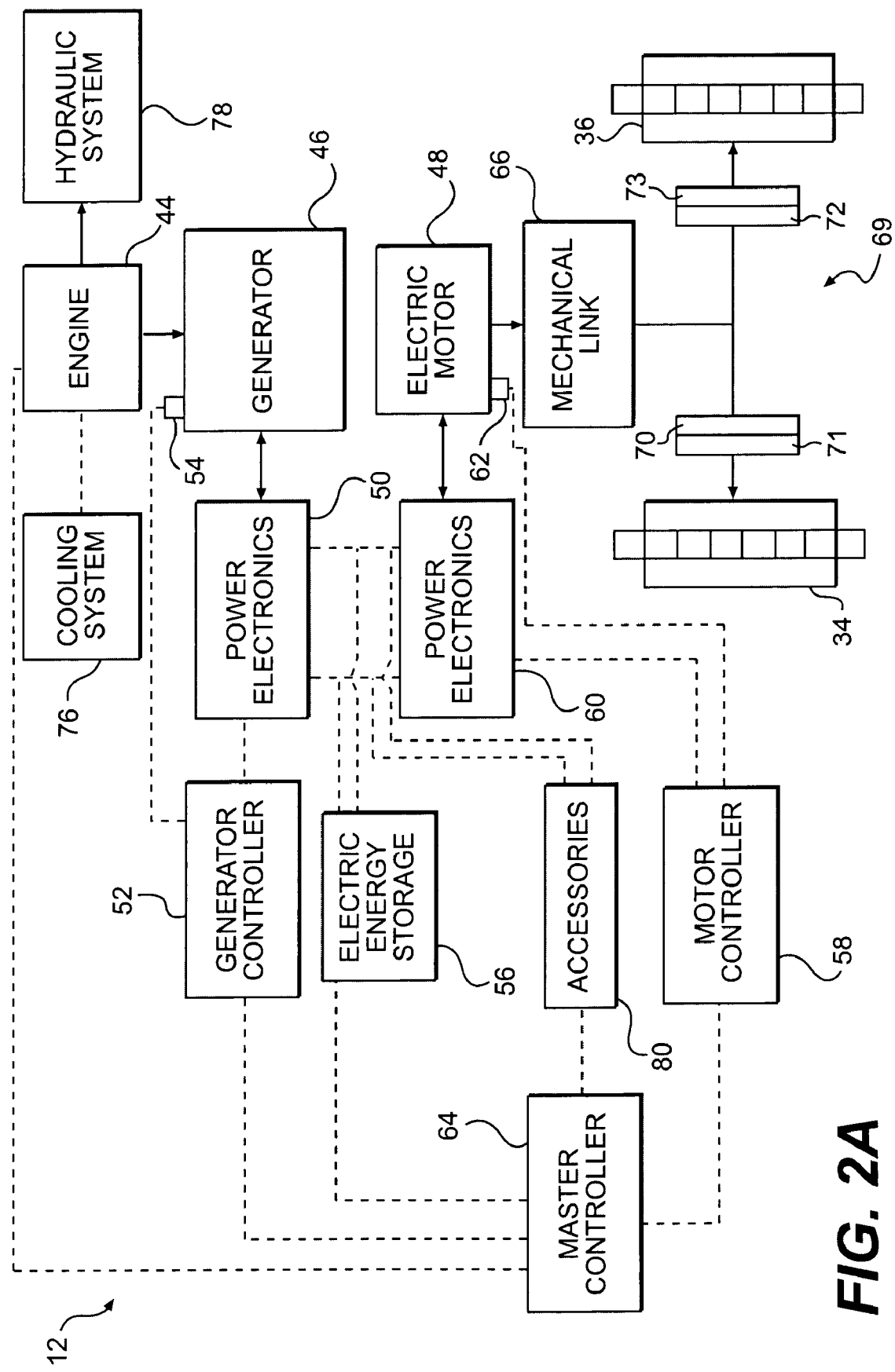
FIG. 2A is a schematic block diagram of a work machine having an electric powertrain according to an exemplary disclosed embodiment.

According to some embodiments, powertrain 12 may include an alternative steering control, for example, as shown in FIG. 2A. In place of differential steering unit 68, mechanical link 66 may be operably connected directly to a clutch and brake system 69. Clutch and brake system 69 may include brakes 70 and 72 and clutches 71 and 73 for driving members 34 and 36, respectively. Brakes 70 and 72 and clutches 71 and 73 may be responsive to a source of fluid pressure (not shown) and/or electrical signal from master controller 64 to steer work machine 10. Clutches 71 and 73 may be alternately engageable and disengageable to respectively connect and disconnect the driving force applied to drive members 34 and 36 of work machine 10. Clutches 71 and 73 may be operated with a control pressure or signal to engage driving members 34 and 36. More specifically, clutches 71 and/or 73 may be fully engaged and may transfer power to the driving members 34 and 36 at a maximum pressure or control signal. At a minimum pressure or control signal, clutches 71 and/or 73 may be fully disengaged with no power being transferred to the driving members 34 and 36. Intermediate these extremes, clutches 71 and/or 73 may be configured to "slip" by a percentage proportional to the control pressure or signal, such that, for example, only a portion of the power may be transferred to driving members 34 and 36. Precise modulation of the control pressure may produce an accurate speed differential between driving members 34 and 36.

According to some embodiments, clutch and brake system 69 may be configured, for example, such that a loss of hydraulic pressure or electrical power will necessarily result in the clutches 71 and 73 being fully disengaged to remove power from the driving members 34 and 36 as a failsafe condition. It should be understood that the clutches 71 and 73 may alternatively be spring-applied and pressure-relieved.

Similarly, clutch and brake system 69 may further include brakes 70 and 72 alternately actuatable and releasable to respectively brake and release driving members 34 and 36 of work machine 10. Typically, brakes 70 and 72 may be hydraulically-operated, disc-type with pressure acting to disengage a spring-applied brake. For example, a maximum brake pressure may fully disengage brakes and 70 and/or 72, while a minimum pressure may fully engage brakes 70 and/or 72. Correspondingly, an intermediate pressure may result in initial braking, which is commonly referred to as "touch up." Clutch and brake system 69 may be configured, for example, such that a loss of hydraulic pressure will necessarily result in brakes 70 and 72 being fully spring-engaged to stop work machine 10 as a failsafe condition.

A cooling system 76 may also be provided for work machine 10 and may be configured to provide adequate cooling for the various systems of work machine 10, including, for example, engine 44, generator 46, electric motor 48, mechanical link 66, differential steering unit 68, steering motor 74, power electronics 50 and/or 60, electric energy storage system 56, and/or a hydraulic system 78 that may be associated with work machine 10. Cooling system 76 may include a water (and/or ethylene glycol and/or other antifreeze/coolant fluid) and/or an oil cooling system associated with engine 44, which may be extended to provide cooling for one or more of the above mentioned systems. Alternatively, or in addition, hydraulic system 78 may include coolers (not shown) and may be extended to provide cooling for one or more of the above-mentioned systems via the hydraulic fluid. Other cooling systems known in the art may be used to provide cooling for work machine 10.

In some embodiments, work machine 10 may include a hydraulic system 78 for operating various hydraulic components of work machine 10 such as, for example, hydraulic actuators used for operating work implements such as exemplary work implement 26 illustrated in FIG. 1. Hydraulic system 78 may include one or more pumps for pressurizing hydraulic fluid in hydraulic system 78 for operating the hydraulic actuators. As mentioned above, hydraulic system 78 may include a cooling system such as, for example, cooling system 76, for cooling the hydraulic fluid, which may experience an increase in temperature during, for example, operation of the various work implements. Cooling system 76 for the hydraulic system may include coolers and may be extended to cool other systems of work machine 10 such as, for example, engine 44, generator 46, electric motor 48, mechanical link 66, differential steering unit 68, steering motor 74, power electronics 50 and 60, and/or electric energy storage system 56, which may be associated with work machine 10.

Work machine 10 may further include various accessories 80 such as, for example, a water pump for circulating cooling water (and/or ethylene glycol and/or other antifreeze/coolant fluid) from engine 44, an air conditioning compressor, a starter motor for starting engine 44, and/or other various devices that may conventionally be powered by belts driven by engine 44. These various accessories 80 may be driven by electric energy via electric motors, rather than by belts. This may provide more versatility in the placement of these various devices on work machine 10 since they are no longer required to be capable of being driven from engine 44 by one or more belts, and may reduce parts and assembly costs as well as maintenance costs associated with belt failure and resulting replacement.

Figure 3:
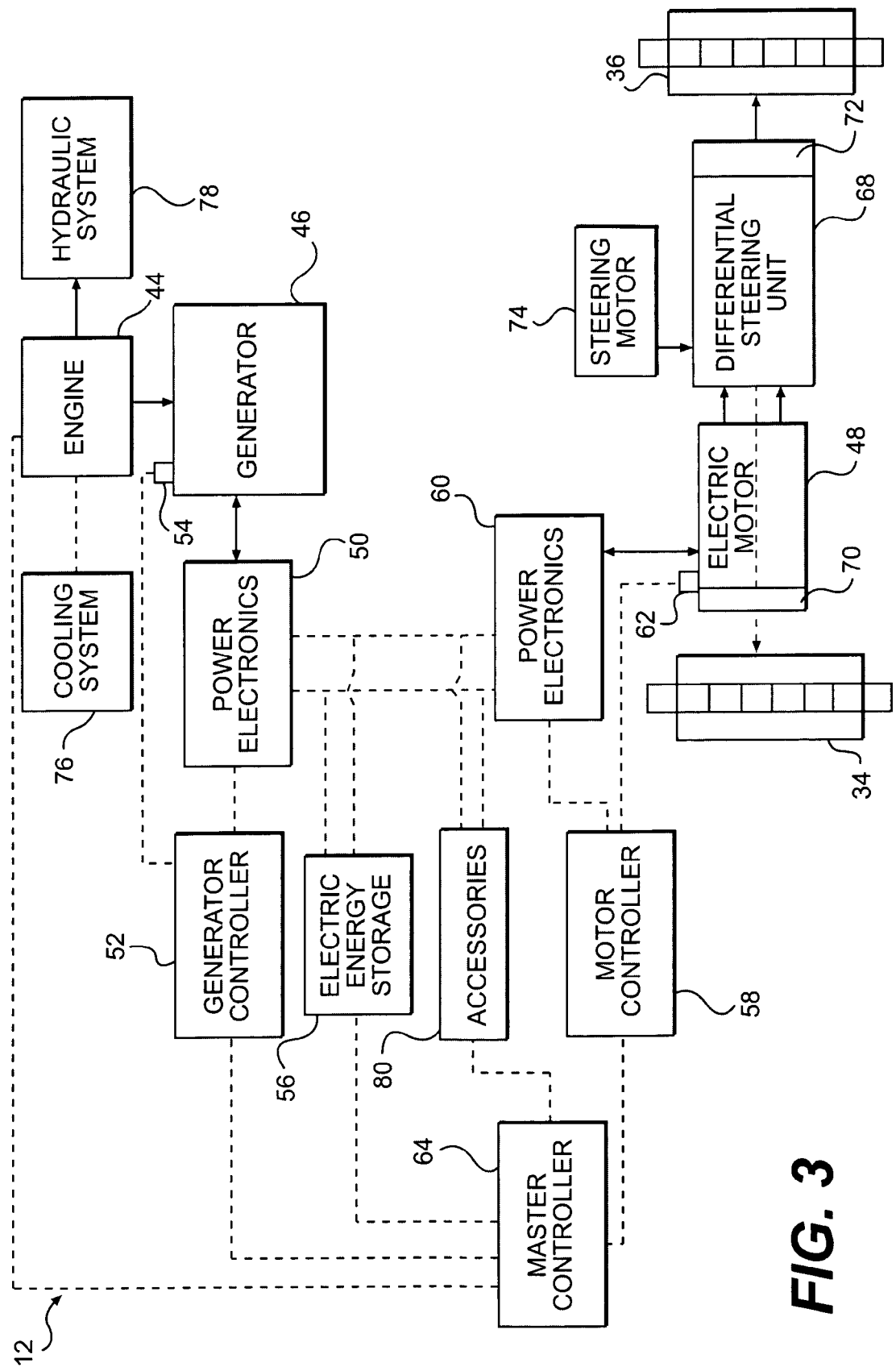
FIG. 3 is a schematic block diagram of a work machine having an electric powertrain according to an exemplary disclosed embodiment.

FIG. 3 illustrates another exemplary embodiment of a work machine 10 having an electric powertrain 12. In contrast to the exemplary embodiment of FIG. 2, electric powertrain 12 of FIG. 3 does not include mechanical link 66. Rather, electric motor 48 is operatively connected in a direct fashion to a differential steering unit 68. Such a configuration may eliminate inherent inefficiencies that may occur in mechanical link 66, which may include a gear assembly for example a spur and/or bevel gear. Furthermore, the exemplary embodiment illustrated in FIG. 3 may result a more efficient use of space within work machine 10's main frame 14, and may result in more efficient packaging of electric motor 48 in combination with differential steering unit 68.

Figure 4:
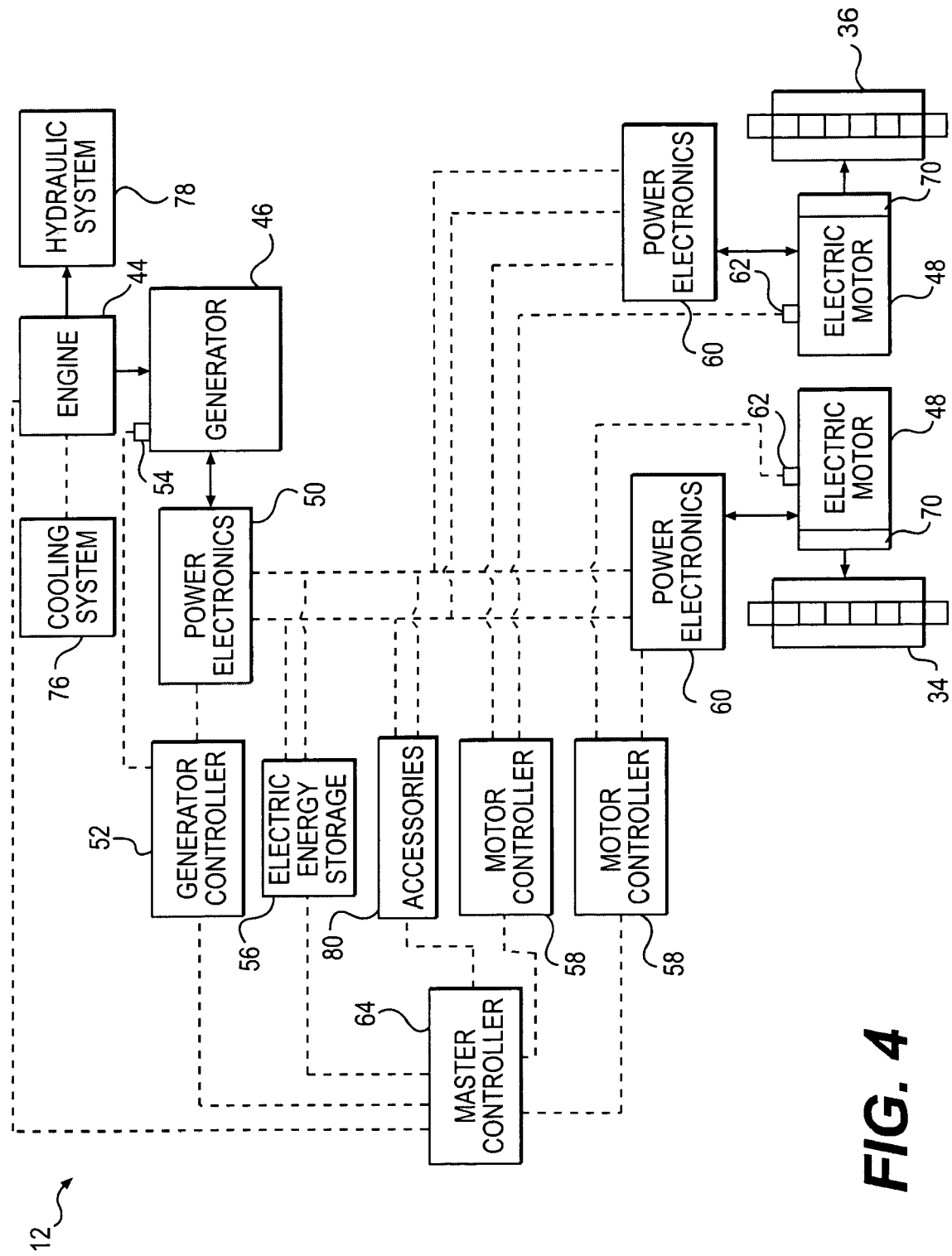
FIG. 4 is a schematic block diagram of a work machine having an electric powertrain according to an exemplary disclosed embodiment.

FIG. 4 illustrates yet another exemplary embodiment of a work machine 10 having an electric powertrain 12. In contrast to the exemplary embodiments of FIGS. 2 and 3, electric powertrain 12 illustrated in FIG. 4 includes more than one electric motor 48 (e.g., two electric motors 48), each configured to drive one of the pair of ground engaging members 22 (e.g., ground engaging tracks).

According to the embodiment of FIG. 4, generator 46 is electrically linked via power electronics 50 associated with generator 46 and at least one (e.g., two) power electronics units 60 associated with the two electric motors 48. Each of the electric motors 48 are respectively coupled to driving members 34 and 36. Power electronics 60 control the two electric motors 48 such that they may operate in a coordinated manner to propel work machine 10 in an operator-commanded direction. For example, by selectively applying more or less torque in either a forward or reverse direction to driving members 34 and 36, the electric motors 48 may propel the work machine in a straight forward direction, a straight reverse direction, a direction curving to the left or right in the forward direction, or a direction curving to the left or right in the reverse direction. Since the electric motors 48 may selectively apply more or less torque to driving members 34 and 36 in either a forward or reverse rotational direction independently of one another, a differential steering unit, a steering motor, a power transfer device, and/or a steering clutch and brake system may be omitted from this embodiment.

Figure 5:
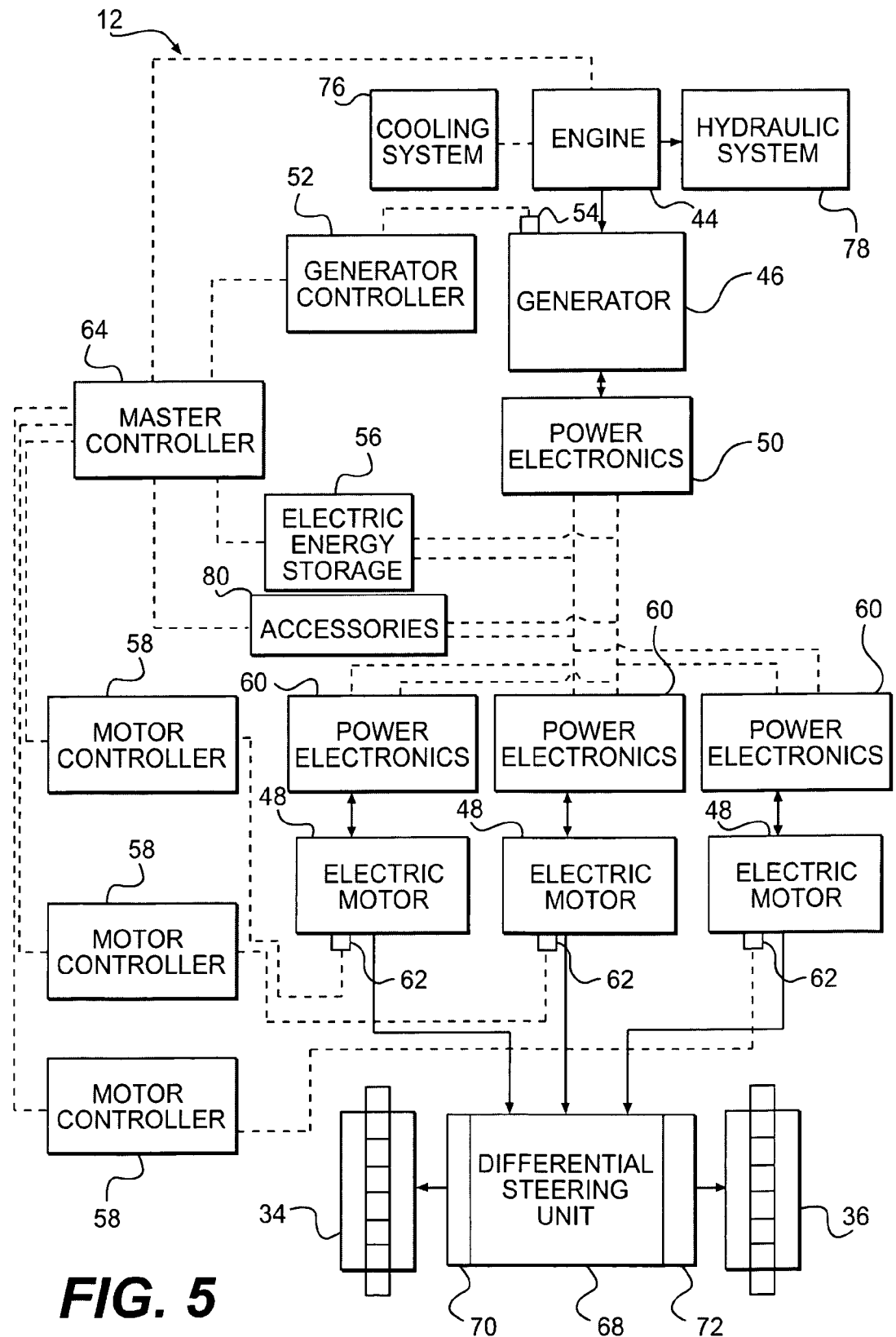
FIG. 5 is a schematic block diagram of a work machine having an electric powertrain according to an exemplary disclosed embodiment.

FIG. 5 illustrates yet another exemplary embodiment of a work machine 10 having an electric powertrain 12. In contrast to the exemplary embodiments of FIGS. 2-4, electric powertrain 12 illustrated in FIG. 5 includes three electric motors 48, however it should be understood that two or more electric motors 48 are function in a similar manner as the three shown, each providing input to planetary gear unit 68'. Each electric motor 48 may be operably coupled to a corresponding motor controller 58 and power electronics unit 60, which may be configured to supply electric power and/or control operation of each of electric motors 48. Each electric motor 48 may supply a torque input to planetary gear unit 68' such that work machine 10 is propelled and steered in an operator-commanded fashion.

INDUSTRIAL APPLICABILITY

The disclosed work machine having an electric powertrain may be applicable to any work machine such as, for example, work machines having ground engaging tracks, or any other work machine known in the art where the reduction of exhaust emissions and/or improved fuel efficiency, among other things, may be desired. By virtue of using an electric powertrain on a work machine, exhaust emissions may be reduced and fuel efficiency may be increased. The operation of exemplary work machines having an electric powertrain will now be explained.

Referring to FIG. 2, engine 44 is operatively associated with generator 46 such that generator 46 is rotated, thereby converting mechanical energy from engine 44 to electric energy. Engine 44 may be operated at one or more predetermined engine speeds (e.g., a range of engine speeds) such that its exhaust emissions are minimized and its fuel efficiency is maximized since the engine speed is not directly related to the torque applied to track driving members 34 and 36. Furthermore, engine 44 and generator 46 may be operatively connected, for example, via appropriate gearing, such that generator 46 is driven at an optimum rotational speed for maximizing its electric energy conversion efficiency.

Power electronics 50 and generator controller 52 may be cooperatively associated with generator 46, for example, to control the conversion of the mechanical energy into electric energy. Power electronics 60 and motor controller 58 may be cooperatively associated with electric motor 48 to supply electric energy to electric motor 48 in a controlled fashion. Master controller 64 may control engine 44, generator controller 52, and/or motor controller 58, accessories 80, electric energy storage 56, or a resistive grid (not shown) to optimize the engine speed and engine load and/or generator speed and/or generator load to reduce (e.g., minimize) exhaust emissions and/or to increase (e.g., maximize) the fuel efficiency of engine 44. Master controller 64 may maximize the electric energy conversion efficiency of generator 46. For example, master controller 64 may be used to allow engine 44 to operate at a relatively narrow engine speed to maximize fuel efficiency and/or minimize exhaust emissions regardless of the real time power requirements of work machine 10. Furthermore, master controller 64 may be used to maximize the efficiency of the operation of generator 46 by optimizing its load and/or rotational speed.

Generator 46 may provide electric energy to electric energy storage system 56 and/or electric motor 48. For example, when the work machine operator sends a command to electric powertrain 12, an appropriate amount of electric energy may be provided for electric motor 48. Electric motor 48 converts the electric energy into a torque and rotates in either a forward or reverse direction in accordance with the operator's command. The torque produced by electric motor 48 supplied to mechanical link 66, which converts the torque from electric motor 48 to an appropriate speed and direction for use by differential steering unit 68. Differential steering unit 68 uses one or more planetary gear trains to transfer torque to each of driving members 34 and 36 (e.g., track driving members) in an appropriate amount. Steering motor 74 operates a portion (e.g., a ring gear) of one of the planetary gear trains of differential steering unit 68 by selectively either preventing the portion from rotating, rotating the portion in a first direction, or rotating the portion in a second direction. By preventing rotation of the portion, substantially equal amounts of speed are transferred to driving members 34 and 36. By rotating the portion in a first direction, relatively more speed may be transferred to one of driving members 34 and 36, and by rotating the portion in the other direction, relatively more speed may be transferred to the other of driving members 34 and 36. The transfer of substantially equal amounts of speed to each driving member 34 and 36 results in work machine 10 traveling in a substantially straight line. Transferring relatively more speed to one of driving members 34 and 36 results in work machine 10 either pivoting or traveling in a non-linear fashion. In order to assist with turning the work machine 10, stopping work machine 10's travel, and/or slowing work machine 10's travel speed, either or both of work machine 10's braking devices 70 and 72 may be activated to apply a resistive torque on driving members 34 and 36.

Referring to electric energy that may be sent to electric energy storage system 56, electric energy stored in electric energy storage system 56 may be used, for example, to start engine 44 and/or to provide supplemental electric energy for operating various accessories on work machine 10 such as, for example, an air conditioning unit and an electric water pump for circulating cooling fluid throughout engine 44 and/or various liquid cooled systems on work machine 10. Electric energy storage system 56 may also be used to provide supplemental electric energy when additional energy is needed, for example, when work machine 10 is both being propelled and operating work implements at the same time.

Electric powertrain 12 may include braking devices 70 and 72, which may be configured to selectively apply a braking force resulting in a slowing of either or both of driving members 34 and 36. Braking may also be provided by causing motor/motors 48 to operate as generators configured to slow work machine 10 via application of a power regenerative load to driving members 34 and 36. For example, as work machine 10 travels down an incline, work machine 10 may be slowed at least in part by a resistive torque developed by one or more motor/motors 48 acting as generators configured to convert the kinetic energy, of the work machine 10 being pulled down the incline by gravity, associated with driving members 34 and 36 into electric energy, and to deliver electric energy to work machine 10 by, for example, storing electric energy in electric energy storage system 56, or drive back through generator 46 acting as a motor to drive engine 44. Alternatively, the electrically energy developed by one or more motor/motors 48 may be dissipated across a resistive grid.

Cooling system 76 may be used to cool engine 44 along with the various elements of electric powertrain 12, which may be sealed and liquid cooled. In particular, generator 46 and/or electric motor 48 may be sealed and liquid cooled to provide a more durable and compact design such that, for example, electric motor 48 has a higher power density and lower inertia rendering it capable of stopping and reversing directions more quickly and efficiently.

Hydraulic system 78 may be used to provide pressurized hydraulic fluid to, for example, hydraulic actuators for operating work implements on work machine 10. For example, referring to FIG. 1, a hydraulic actuator associated with one or more lift cylinders 30 may be actuated to raise and lower work implement 26, and hydraulic actuators associated with one or more tilt cylinders 32 may be actuated to tilt work implement 26 left and right. Furthermore, pressurized hydraulic fluid may be used to operate steering motor 74 for steering work machine 10.

Referring to the exemplary work machine electric powertrain 12 illustrated in FIG. 3, electric motor 48 may be operatively connected in a direct fashion to differential steering unit 68 to provide torque directly to differential steering unit 68. The torque transferred to differential steering unit 68 is used to drive driving members 34 and 36 (e.g., track driving members) in the same manner as described with reference to the exemplary embodiment shown in FIG. 2.

The exemplary embodiment shown in FIG. 4 includes two electric motors 48. Generator 46 is operably coupled to each of electric motors 48, and each of electric motors 48 is coupled to a respective one of driving members 34 and 36 (e.g., track driving members). For example, generator 46 may be operably coupled to power electronics 50, generator controller 52 and generator sensor 54, and each electric motor 48 may be operably coupled to motor controller 58, power electronics 60, and a motor sensor 62. Master controller 64 may control generator controller 52 and motor controllers 58, which in turn, respectively control power electronics 50 associated with generator 46 and each of power electronics 60 associated with each of electric motors 48, such that they may operate in a coordinated manner to propel work machine 10 in an operator-commanded direction. For example, by selectively applying more or less speed in either a forward or reverse direction to driving members 34 and 36, electric motors 48 may propel work machine 10 in a straight forward direction, a straight reverse direction, in a direction curving to the left or curving to right in either the forward or reverse direction.

The exemplary embodiment shown in FIG. 5 includes three electric motors 48, however two or more may be used, configured to provide input into planetary gear unit 68'. Generator 46 is operably coupled to each of electric motors 48, and each of electric motors 48 is coupled to planetary gear unit 68', which, in turn, is operably coupled to driving members 34 and 36. For example, generator 46 may be operably coupled to power electronics 50, generator controller 52 and generator sensor 54, (as mentioned earlier in place of the power electronics 52 a rectifier may be used and generator sensor 54 may not be required based on the control logic used) and each electric motor 48 may be operably coupled to a motor controller 58, a power electronics 60, and a motor sensor 62. Master controller 64 may control generator controller 52 and motor controllers 58, which in turn, respectively control power electronics 50 associated with generator 46 and each of power electronics 60 associated with each of electric motors 48, such that they may operate in a coordinated manner to provide input into planetary gear unit 68' and propel work machine 10 in an operator commanded direction. For example, by selectively operating the three electric motors 48 in a coordinated fashion via master controller 64, electric motors 48 may propel work machine 10 in a straight forward direction, a straight reverse direction, in a direction curving to the left or curving to right in either the forward or reverse direction.

It will be apparent to those skilled in the art that various modifications and variations can be made to the disclosed work machine having an electric powertrain. Other embodiments will be apparent to those skilled in the art from consideration of the specification and practice of the disclosed work machine. It is intended that the specification and examples be considered as exemplary only, with a true scope being indicated by the following claims and their equivalents.

What is claimed is:

1. A track-type tractor having an electric drive system comprising:
   an engine configured to provide rotational energy and an electrical generator configured to receive the rotational energy from the engine and to thereby produce electrical energy;
   at least one electric motor having a rotational output lying on an output axis, for receiving electrical energy from the generator and thereby producing output rotational energy at the rotational output, wherein the at least one electric motor is a liquid-cooled electric motor;
at least one power electronics unit configured to control an output of the at least one electric motor, wherein the at least one power electronics unit is liquid cooled;
a differential steering unit operably coupled to the at least one electric motor, the differential steering unit having a first output linked to a first driving member and a second output linked to a second driving member, the first and second outputs being axially aligned with one another and with a central axis of the differential steering unit, wherein the central axis of the differential steering unit is non-coaxial with the output axis of the at least one electric motor;
a hydraulic steering motor operatively coupled to the differential steering unit to cause the differential steering unit to selectively control an amount of torque supplied to each of the first and second driving members; and
an electric energy storage system configured to receive energy from the at least one electric motor during deceleration of the tractor, the storage system further being configured to provide energy to the at least one electric motor in addition to energy produced by the generator to prevent the engine from lugging or stalling.

2. The tractor of claim 1, wherein the at least one electric motor is a sealed, brushless, liquid-cooled electric motor.

3. The tractor of claim 1, wherein the at least one electric motor includes at least one of a permanent magnet-type motor, an induction-type motor, a switched reluctance-type motor, and a hybrid combination electric motor.

4. The tractor of claim 1, wherein the generator is sealed and liquid cooled.

5. The tractor of claim 1, wherein the generator consists of at least one of a permanent magnet-type generator, an induction-type generator, a switched reluctance-type generator, and a hybrid combination generator.

6. The tractor of claim 1, wherein the at least one power electronics unit is housed in a sealed compartment.

7. The tractor of claim 1, including a braking system configured to reduce torque provided by at least one of the first and second driving members.

8. A track-type tractor comprising:
an engine configured to provide mechanical energy;
a generator configured to convert at least a portion of the mechanical energy provided by the engine into electric energy;
at least one electric motor operably coupled to a power electronics unit to receive the electrical energy and convert the electrical energy into rotational energy;
at least one power electronics unit configured to control an output of the at least one electric motor, wherein the power electronics unit is liquid cooled;
tracks located on each side of the tractor;
a differential steering unit operably coupled to the at least one electric motor and the tracks, the differential steering unit being configured to selectively control an amount of torque supplied to each of the tracks; and
a hydraulic steering motor operatively coupled to the differential steering unit to cause the differential steering unit to selectively control an amount of torque supplied to each of the tracks.

9. The tractor of claim 8, further including a master controller, wherein the master controller is configured to modify the rotational speed of the generator.

10. The tractor of claim 8, wherein the hydraulic steering motor is a fluid motor operably coupled to a hydraulic system.

11. The tractor of claim 8, wherein the at least one electric motor includes at least one of a permanent magnet-type motor, an induction-type motor, and a switched reluctance-type electric motor.

12. The tractor of claim 8, wherein the power electronics unit is further configured to control at least one of the engine and the generator to reduce exhaust emissions from the engine.

13. The tractor of claim 8, wherein the generator and the power electronics unit are sealed and liquid cooled.

14. The tractor of claim 8, wherein the generator includes at least one of a permanent magnet-type generator, an induction-type generator, a switched reluctance-type generator, and a hybrid combination generator.

15. The tractor of claim 8, including a braking system configured to reduce torque provided to at least one of the tracks.

16. The tractor of claim 8, further including an energy storage system configured to receive energy from the at least one electric motor during deceleration of the tractor.

17. The tractor of claim 16, wherein the energy storage system is configured to provide energy to the at least one electric motor in addition to energy produced by the generator when the tractor is traversing and actuating the work implement at the same time.

18. A track-based mobile machine comprising:
an engine configured to provide mechanical energy;
a hydraulic system powered by the engine;
a work implement powered by the hydraulic system;
a generator configured to convert at least a portion of the mechanical energy provided by the engine into electric energy;
a power electronics unit configured to receive at least a portion of the electrical energy from the generator, wherein the power electronics unit is liquid cooled;
at least one electric motor operably coupled to the power electronics unit to receive the electrical energy and convert the electrical energy into rotational energy, wherein the at least one electric motor is a sealed, liquid-cooled motor;
a track located on each side of the machine;
a differential steering unit operably coupled to the at least one electric motor and the tracks, the differential steering unit being configured to selectively control an amount of torque supplied to each of the tracks;
a hydraulic steering motor operatively coupled to the differential steering unit to cause the differential steering unit to selectively control an amount of torque supplied to each of the tracks; and
an electric energy storage system configured to receive energy from the at least one electric motor during deceleration of the machine and provide energy to the at least one electric motor in addition to energy produced by the generator when the work machine is traversing and actuating the work implement at the same time.

19. The machine of claim 18, further including a master controller, wherein the master controller is configured to modify the rotational speed of the generator.

* * * * *